Figure 1:
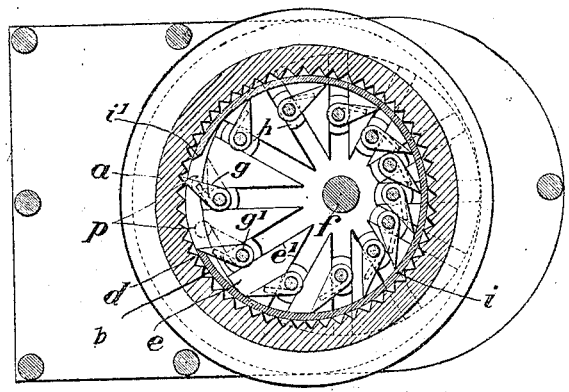

Jan. 20, 1925. 1,523,695

A. LAUB

CHANGE SPEED GEARING

Filed June 26, 1924

Inventor
Adolf Laub
by Langner, Parry, Card + Langner
Attys.

Patented Jan. 20, 1925.

1,523,695

UNITED STATES PATENT OFFICE.

ADOLF LAUB, OF BASEL, SWITZERLAND, ASSIGNOR TO USINE LAUBA SOCIÉTÉ ANONYME, OF BASEL, SWITZERLAND.

CHANGE-SPEED GEARING.

Application filed June 26, 1924. Serial No. 722,602.

*To all whom it may concern:*

Be it known that I, ADOLF LAUB, a citizen of the Republic of Switzerland, and resident of Basel, Switzerland, have invented new and useful Improvements in Change-Speed Gearing, of which the following is a full, clear, and exact specification.

This invention relates to change speed gearing of the type comprising a ring of pawls adapted to transmit the motion of a driving rotary part to a driven rotary part, the pawls being adjustable in radial guide slots eccentrically to the axis of rotation of the driven part. In this type of gearing in which a ring of pawls arranged concentrically with a crown of teeth is provided, it has been proposed to utilize an annular shield which exposes the crown of teeth only at the point where the drive by the pawls is to be effected, and which acts as a device for controlling the action of the pawls, with a view to restricting this action of the pawls to one part only of the crown. It is also possible to arrange the device in such a manner that the ring of pawls can be displaced in relation to the crown of teeth, the annular shield being maintained in a fixed position. This arrangement, however, possesses the disadvantage that the working position of the driving pawls is altered relative to the crown of teeth, when the ratio of transmission is altered, so that the driving action of the pawls becomes unreliable in certain circumstances, particularly when the pawls are constructed in the form of long levers.

The subject matter of the present invention is a gearing which, although bearing some resemblance to the above described well known form of construction, avoids the disadvantage above referred to. In accordance with the present invention the annular shield together with the crown of teeth and the driving pawls can be displaced relative to the axis of the gearing in such a manner as to maintain the driving pawls constantly in the same working position when the pawls are displaced.

The drawing shows a constructional example of the subject matter of the invention.

Figure 1 is a cross section, and

Figure 2:
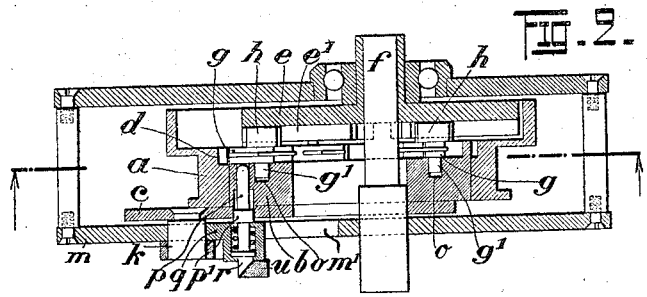
Figure 4:
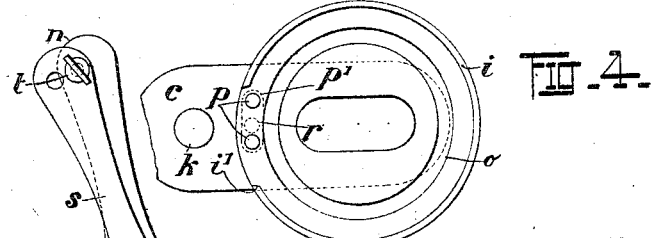
Figure 3:
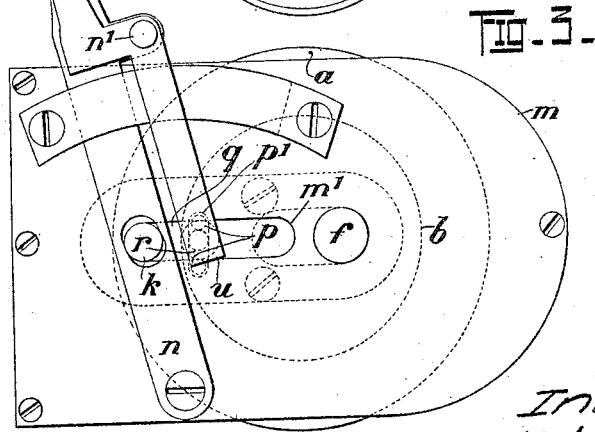

Figure 2 a longitudinal section thereof;

Figures 3 and 4 are detail views.

A driving belt pulley $a$ is fitted loosely upon and rotates about an annular body $b$, which is mounted upon a movable plate $c$. The pulley $a$ is provided internally with a crown of teeth $d$. The driven rotary part consists of a disc $e$ rigidly secured to a shaft $f$ which passes through a longitudinal slot in the annular body $b$ and in the plate $c$. In radial lots $e'$ in the disc $e$ are mounted, in the well known manner, pawls $g$ controlled by springs and adapted to slide radially in the slots so as to work in conjunction with the crown of teeth $d$. These pawls are pivoted at $g'$ to sliding blocks $h$ guided in the said slots, and their springs tend to hold them in their engaging position. The annular body $b$ is provided with a covering ring or shield $i$ for the teeth $d$. At the point $i'$ in this shield there is an opening extending over a certain distance, in the periphery of the said shield; and those pawls, the position of which does not coincide with this opening, are kept out of contact with the crown of teeth $d$ whilst the pawl or pawls which are situated within reach of the said opening are caused to mesh with the teeth of the crown of teeth $d$ under the action of their springs.

The pivots $g'$ of the pawls $g$ engage with a circular guiding slot $o$ which is machined in the annular body $b$ (Figure 4), and, when the said slot is displaced transversely relative to the shaft $f$, the pawls are displaced radially in the slots $e'$ of the disc $e$.

The plate $c$ together with the parts which it carries is secured to a stud $k$ which is guided in a slot $m'$ formed in the frame plate $m$. The stud $k$ can be displaced by means of a hand-lever $n$ (Figure 3) in such a manner that the body $b$ can be adjusted to a coaxial or to a more or less eccentric position relative to the shaft $f$ of the driven disc $e$.

When the annular body $b$ is placed coaxially relative to the shaft $f$ of the disc $e$ the ring of pawls is also coaxial with the disc $e$ and the driving belt pulley $a$ drives the disc $e$ at the same speed, through the intermediary of the pawls which come one after the other within reach of the opening $i'$ where the driving action takes place. When the annular body $b$ is displaced from its coaxial position and moved towards the left by means of the lever $n$, as shown in Figure 1, (there is no disadvantage in this displacement of the body $b$ provided that the belt runs on the pulley $a$ perpendicularly to the direction of displacement) the ring of pawls is brought in a position which is eccentric to that of the shaft $f$, and any pawl $g$ which comes within reach of the opening $i'$ in the covering shield $i$ is brought into action on a larger radius, in such a manner that the rotary motion of the belt-pulley $a$ is transmitted by the said pawl at a definite ratio of transmission, to the driven disc $e$ at the point where the drive is effected. The peripheral length of the opening $i'$ and the arrangement of the slots in the disc $e$ are, for this purpose, so arranged that, prior to the pawl, which transmits the driving power, leaving the opening $i'$, the next successive pawl is already within the opening for the purpose of continuing the transmission of power. The greater the displacement towards the left of the annular body $b$ as shown in Figure 1, the smaller the ratio of the transmission of power from the driving to the driven element. Arrangements are thus provided for obtaining any desired ratio of transmission within definite limits by displacing the annular body $b$ to a more or less considerable extent. It will readily be understood that the annular body $b$ or the lever $n$ employed for displacing the said body can be arranged so as to be locked in any position required by any suitable mechanism such as locking gear, catches, or the like.

In order to enable the gearing to run idle when required a device is provided by which the pawls $g$ can be prevented from engaging at the point where the driving action takes place. For this purpose two disengaging pins $p$ are arranged in recesses in the annular body $b$. These pins are carried by a bridge $p'$ which is connected to a plunger $r$ fitting within block $q$ which is guided in a slot $m'$ formed in the frame plate. An auxiliary lever $s$ is provided pivoted at the point $n'$ on the lever $n$, the auxiliary lever $s$ being in normal circumstances coupled with the lever $n$ by means of a locking bolt $t$. The lever $s$ carries a bevelled lifting element $u$ (Figure 2) by means of which, after releasing the lever $n$, the plunger $r$ can be displaced axially (against the action of a spring), by turning the auxiliary lever $s$ in such a manner that the pins $p$ are brought within reach of the pawls during the rotation of the latter, and thus prevent the said pawls from assuming a position in which they can engage with the crown of teeth $d$ when they enter the region in which the driving action takes place so that the pawls remain disconnected.

The gearing described above is particularly suitable as a substitute for cone pulleys in machine-tools, lathes and similar apparatus, although it can also be employed in the construction of motorcars and for similar applications. It possesses in all cases the advantage, not only of producing a gradual alteration of the speed, but also of rendering possible any alteration of the speed of the driven part, however small. Instead of a belt-pulley a pinion could be employed which, when displaced, would remain continuously in rotary contact with the primary driving part. The disc which carries the ring of pawls could also be the driving element and the disc fitted with the crown of teeth the driven element.

What I claim is:

1. A change-speed gearing comprising a rotary driving element, a rotary driven element, a crown of teeth on one of these elements, a ring of eccentrically adjustable driving pawls on the other element for transmitting the motion, a covering ring or shield designed to control said pawls as regards their meshing and driving action and provided to this end with an opening at the place where the driving action shall take place, and means to displace said covering ring together with the crown of teeth and the driving pawls relative to the axis of said other rotary element, in such a manner that the driving pawls, when displaced, are always kept in the same working position.

2. A change speed gearing comprising a rotary driving element, a rotary driven element, a crown of teeth on one of these elements, a ring of eccentrically adjustable driving pawls on the other element for transmitting the motion, a covering ring or shield designed to control said pawls as regards their meshing and driving action and provided to this end with an opening at the place where the driving action shall take place, means to displace said covering ring together with the crown of teeth and the driving pawls relative to the axis of said other rotary element and a disengaging member at the opening in said covering ring normally kept out of engagement with the pawls and means to shift said disengaging member within reach of the pawls in the course of rotation of the latter, so that the said pawls may be prevented from assuming the position in which they engage with the teeth.

In witness whereof I have hereunto signed my name this 14th day of June, 1924, in the presence of two subscribing witnesses.

ADOLF LAUB.

Witnesses:
MADELEINE SPENGLER,
AMAND BRAUN.